T. J. FUTRELL.
AUTOMATIC COUPLING FOR RAILWAY CARS.
APPLICATION FILED JAN. 4, 1916.
1,193,535.
Patented Aug. 8, 1916.
2 SHEETS—SHEET 1.
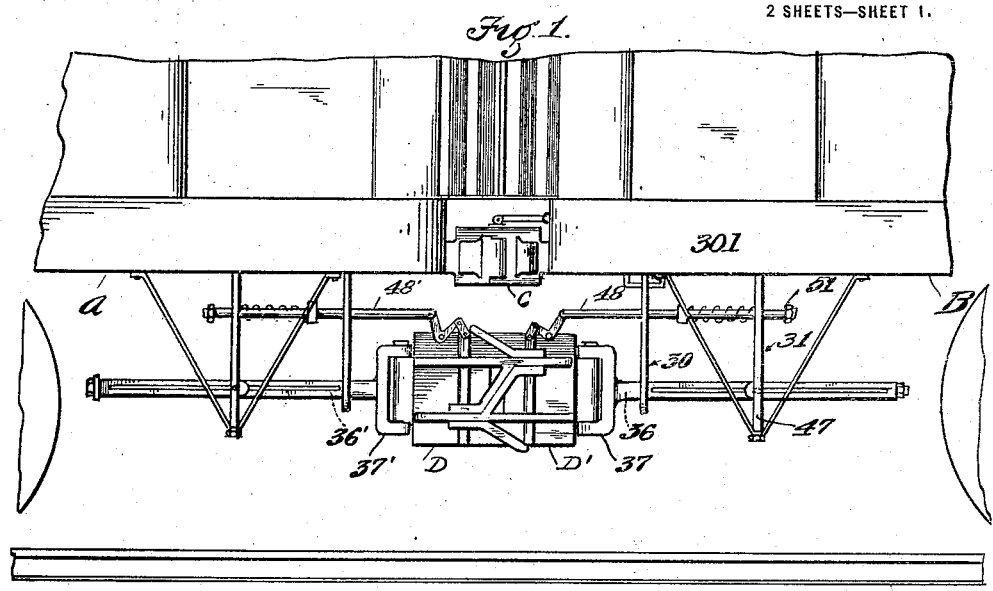
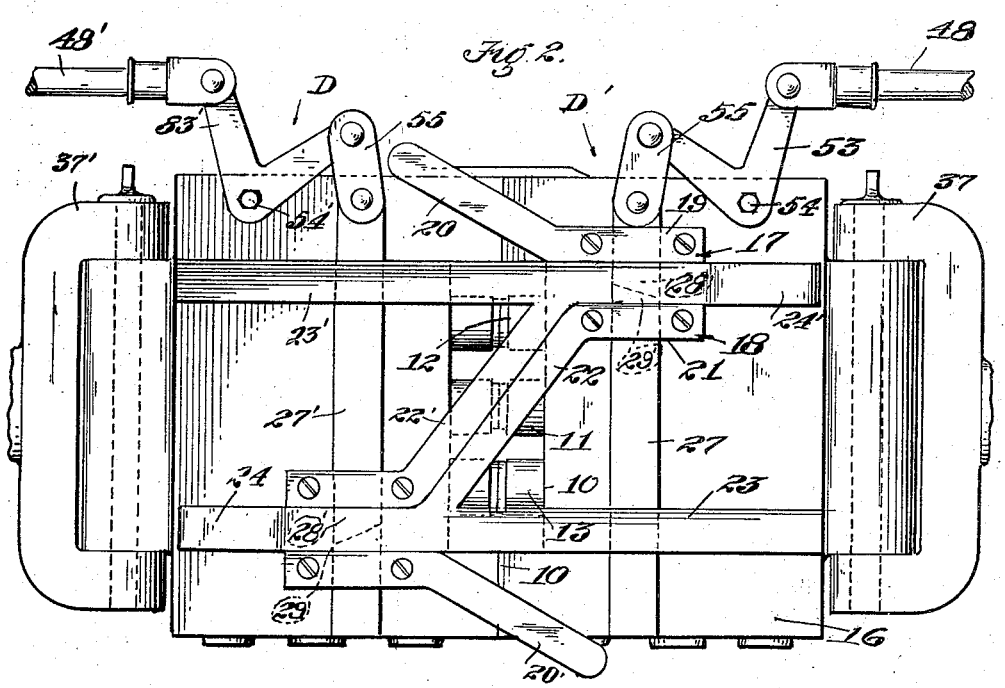
Inventor.
Thomas J. Futrell.
by Hazard, Berry and Miller
Att'ys

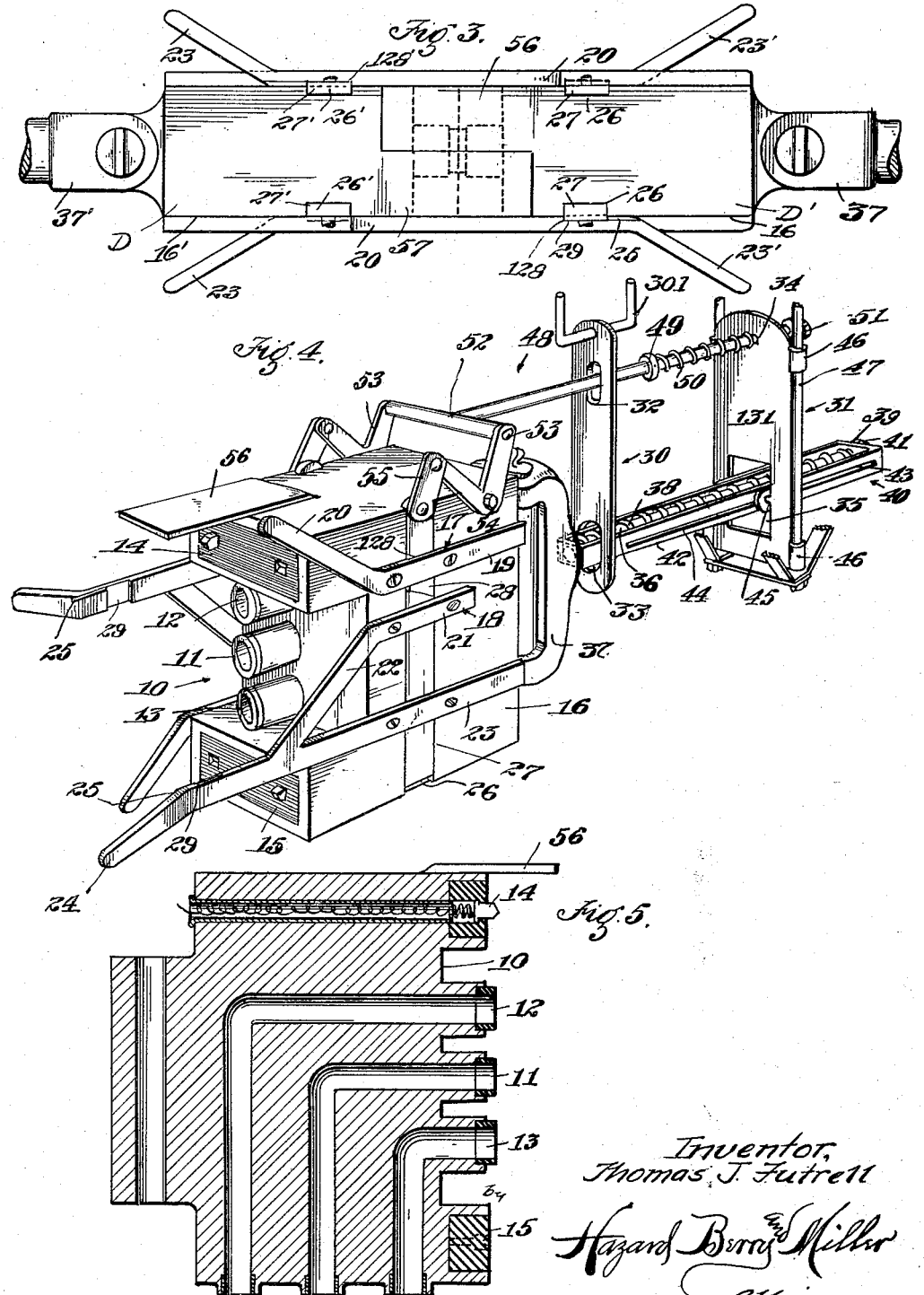

UNITED STATES PATENT OFFICE.

THOMAS J. FUTRELL, OF LOS ANGELES, CALIFORNIA, ASSIGNOR TO AUTOMATIC STEAM, AIR, ELECTRIC LIGHT AND TELEPHONE COUPLER COMPANY, OF PHOENIX, ARIZONA, A CORPORATION OF ARIZONA.

AUTOMATIC COUPLING FOR RAILWAY-CARS.

1,193,535. Specification of Letters Patent. Patented Aug. 8, 1916.

Application filed January 4, 1916. Serial No. 70,201.

*To all whom it may concern:*

Be it known that I, THOMAS J. FUTRELL, a citizen of the United States, residing at Los Angeles, in the county of Los Angeles and State of California, have invented new and useful Improvements in Automatic Couplings for Railway-Cars, of which the following is a specification.

My invention relates to an automatic coupling for railroad cars.

It is an object of this invention to devise an apparatus for automatically coupling and uncoupling the end connections, such as steam pipes, air pipes for brakes and automatic signaling and electric conduits for telephone and light when the drawbars of the adjacent ends of the railroad cars are coupled together by any of the automatic couplers now in use on railroad cars in interstate commerce.

Another object of this invention is to provide a pair of coöperating coupling heads suspended from the ends of the cars to be coupled together and which are provided with the electric, steam and air connections above referred to. These coupling heads are so constructed that at the moment when the automatic coupler connects the drawbars of the cars, the coupling heads of my invention will automatically lock and remain in their locked position until the coupler connecting the drawbars of the cars is unlocked when said heads will automatically become unlocked and separate.

It is another object of this invention to construct an apparatus comprising two coöperating coupling heads which will be positive in operation and form perfect joints of the steam, air and electric connections above referred to, notwithstanding the fact that the two coöperating coupling heads may be at the moment of coupling out of vertical and horizontal alinement with each other. Provision is made in the construction of my improved apparatus that the same will automatically and positively operate, taking care of any maximum lack of alinement which may occur during the normal operation of railroad cars.

It is another object of this invention to construct an apparatus which is simple of construction, composed of a minimum number of parts and not liable to get out of order.

This invention is an improvement over my United States patent granted December 22, 1914, No. 1,122,098 for an automatic coupling for railway cars.

With these and other objects in view which will appear as the description proceeds, my invention consists in the novel construction, combination and arrangement of parts hereinafter described and claimed.

In the accompanying drawings which form a part of this specification, I have illustrated a convenient and practical embodiment of my invention and in which:

Figure 1 is a side elevation of my coupling apparatus in locking position, as applied to railway cars. Fig. 2 is a side elevation of the coupling apparatus in locking position. Fig. 3 is a top plan view thereof. Fig. 4 is a perspective view of one of the coupling heads. Fig. 5 is a vertical longitudinal section of the coupling head showing the electric, steam and air conduits in the head.

In Fig. 1, A and B designate the adjacent ends of two railway cars equipped with a coupler C of any preferred construction for connecting the drawbars of said cars. My coupling apparatus is disposed below said coupler C and comprises a pair of coupling heads D and D' connected, respectively, to the cars A and B.

Referring to the coupling head D' shown in Fig. 4, said head consists of a rectangular block of greater height than width whose forward end is provided with the connecting ends of a steam conduit 11, projecting from the middle of the front face 10 of said head. Above and below said steam connection are a pair of the air pipe connections 12 and 13 for the air brake and automatic signal apparatus, respectively. 14 and 15 denote the electric light and telephone connections, respectively, which project horizontally from the upper and lower ends of the front face 10 of the coupling head. The head D is provided on its front face with corresponding electric, steam and air connections which coöperate with the connections of the head D'. The steam and air connections are provided with suitable gaskets to make tight joints when the heads are locked together. The lateral face 16 of the coupling head D' is provided with a pair of guide arms 17 and 18 which are secured to the upper portion of said face. The rear portion 19 of the arm 17 extends horizontally on said face. The front portion 20 projects upwardly at an angle in the same vertical plane as the rear portion 19, and beyond the front face 10 of the head D'. The rear portion 21 of the lower guide arm 18 extends in spaced and parallel relation with the rear portion 19 of the arm 17. The front portion 22 of the guide arm 18 extends in the same vertical plane as the rear portion 21 and at an angle downwardly therefrom. The extreme forward end of the front portion 22 is formed integral with a coupling bar or arm 23 which is secured to the lower portion of the lateral face 16 and which projects horizontally therefrom. The outer portion 24 of the coupling bar 23 extends at an angle outwardly from the face 16 and in a horizontal plane. An inclined notch 25 is provided on the inner face of the locking bar near the point where the outer portion 24 is turned outwardly, said notch forming an inclined plane toward the rear of said coupling bar. The lateral face opposite to the face 16 is provided with a similar set of guide and locking bars, the only difference being that their position is reversed, to wit, the coupling bar is on the upper portion of the face, while the guide bars are on the lower portion of said face. The lateral faces of the head D' are provided with a pair of vertical grooves or channels 26 oppositely disposed in which a pair of locking bars 27 are slidably mounted. Each locking bar is provided at its lower end with a lug 28 tapered toward the rear. These lugs project from the faces of the locking bars and the lateral sides of the heads and are adapted to coöperate in locking engagement with a vertical slot 29 on the inner face of the coupling bar 23' of the opposite head D'. The inner faces of the guide bars adjacent to the locking lugs 28 are provided with vertical slots 128 to allow for the vertical movement of the latter.

Referring to Fig. 2, it will be seen that the coupling head D is provided with guide bars, coupling bars, locking bars, and lugs in the same manner as coupling head D', the only difference being that the position of the guide bars and coupling bars is reversed. That is to say, the coupling bar 23' is located on the upper half of the lateral face 16' of the head D, while the guide bars 17' and 18' are located on the lower half. 20' designates the forward end of the guide bars 17', and 22', the forward end and connecting member of the guide bar 18' leading to the coupling bar 23'. 24' designates the forward end of the coupling bar 23'. 26' is a vertical groove cut in the face 16' of the head D in which a locking bar 27' is slidably mounted. Near the lower end thereof a locking lug 28' projects from the face of the locking bar 27'. The inner face of the guide bar 18' being cut away to form a vertical slot 128' to allow vertical movement of said lug. 29' is a vertical slot on the inner face of the coupling bar 23' adapted to coöperate with the locking lug 28 of the head D', while the lug 28' on the coupling head D coöperates with the vertical slot 29 of the coupling bar 23.

As clearly shown in Fig. 2, the vertical slots 29 and 29' on the coupling bars 23 and 23', respectively, are so located that when the same are engaged by the locking lugs 28' and 28, respectively, the ends of the electric, steam and air connections of the coupling heads D and D' will be in intimate contact with each other to form tight joints, as will be understood. The lateral face of the coupling head D opposite to the face 16' thereof, is provided with guide bars, coupling bars, locking bars and lugs in the same manner as the face 16', the only difference being that their position is reversed. By reversing the position of the locking bars and guide bars on the opposite faces of the coupling heads, a more balanced construction of the coupling apparatus is obtained.

The coupling heads are suspended or attached to the railway cars as follows: Referring to Fig. 1, vertical hangers 30 and 31 extending downwardly from the bottom of the car in spaced relation to each other are provided. The hanger 30 is loosely suspended from a hanger bracket 301 fast to the bottom of the car, the horizontal rod-like portion of said bracket passing through an aperture at the upper end of the hanger 30 which has a limited lateral swinging motion and is capable of movement longitudinally of said bracket in the direction of the length of the car. Hanger 30 is provided with a vertical slot 32 at the upper end, and a circular bore 33 in its lower end. The hanger 31 consists of two hanger rods 47, on which a hanger plate 131 is slidably mounted. Said plate 31 is provided with a pair of perforated ears 46 on each of its vertical edges which are slidably mounted on a pair of vertical hanger rods 47, extending from the bottom of the car, but allowing vertical movement of said hanger plate 131. The hanger plate 131 has a circular bore 34 at its upper end and a square aperture 35 at its lower end. Slidably mounted in the apertures 33 and 35 in the lower ends of hangers 30 and 31, is a coupling head supporting member or rod 36. The forward end of said rod is securely mounted on a rear bracket 37 pivoted to the rear face of the coupling head. A coiled spring 38 encircles the rod 36, the inner end of said spring abutting against the rear bracket 37, the outer end engaging the transverse member 39 of a U shaped guide member 40, which is secured to the outer end of rod 36 by means of a nut 41 in threaded engagement with the end of said rod. A pair of guide members 42 whose inner ends are fast to the rear bracket 37 extend through bore 33 in the hanger 30 and in parallel relation to rod 36 and on opposite sides thereof, the outer ends of said guide members extending between the outer ends of the guide members 40 and the coiled spring 38. The U shaped guide member 40 and the guide members 42 are provided with longitudinal slots 43 and 44 adapted to be engaged by lugs or pins 45 horizontally projecting from the vertical sides of the square aperture 35 of the hanger plate 131. It will be evident from the construction of the coiled spring and the guide members 40 and 42 that the coupling head D' is mounted for horizontal movement in the hanger 30, the limit of said movement being the length of the slot 44 in the U shaped guide member 42. The locking bars 27 and 27' of the coupling heads are operated as follows: A locking bar operating rod 48 is movably mounted in the slot 32 and aperture 34 of the hangers 30 and 31, respectively. Said rod 48 is provided between said hangers with a collar 49 fast thereon and a coiled spring 50 encircling said rod 48 is disposed between said collar and the hanger plate 131. The outer end of the rod 48 is provided with a stop member 51 adapted to engage the rear face of the plate 131. The stop member 51 serves to limit the forward movement of said rod 48. The inner end of the rod 48 is connected to a horizontal bar 52 whose extremities are pivoted to a pair of bell crank levers 53 fulcrumed at 54 to the lateral faces of the coupling head. Pivoted links 55 connect the upper ends of the locking bars to said bell crank levers. In order to protect the joints of the steam, air and electric conduits from rain and the like, the upper forward ends of the heads D and D' are provided with projecting protector plates 56, 57 respectively, which, when said heads are coupled together form a roof for said joints.

Operation: Assuming that cars A and B are to be coupled together to connect the draw-bars of said cars, and the electric, steam and air conduits, whose end connections are projecting from the outer ends of the coupling heads D and D'. The locking bars 27 and 27' with their lugs 28 and 28' are normally pressed downwardly with yielding pressure by the springs 50 pressing rod 48 forwardly. The coupling bars 23 and 23', will be guided by the guide bars to their respective positions. As the forward end of the coupling bars engage the lugs 28 and 28', respectively, the latter will be lifted up against the tension of the spring 50 sliding along the inclined notches 25 provided on said coupling bars. As soon as the vertical slots 29 on the coupling bars are in registry with the locking lugs 28 and 28', the latter will be moved into locking position therewith. The coupling heads will thus be securely coupled and locked together, the electric, steam and air connections forming tight joints. It should be noted that by reason of the outer ends of the locking bars 24 and 24', respectively, being turned horizontally outward and the forward ends 20 and 20' of the guide bars being turned vertically outward, the coupling bars will be positively guided in locking position, irrespective of the lack of vertical or horizontal alinement of the coupling heads. The ends of said coupling bars and guide bars respectively, are turned outwardly to an extent which will take care of any lack of alinement of said coupling heads which is liable to occur in the normal operation of railway cars. The automatic unlocking and uncoupling of coupling heads, takes place as follows: Assuming that the coupler C connecting the drawbars of the cars A and B has been unlocked and the cars recede from each other, the coupling heads D and D' will still be coupled and locked together for a moment of time, but as the hanger 30 is permanently connected to the car and has only a limited longitudinal movement and hanger 31 is rigidly secured to the car, they will move away from the coupling head and in so doing, the coiled spring 38 will be extended. The stop member 51 at the end of rod 48 will engage the hanger plate 131 and will limit the relative forward movement thereof. As the stop member 51 engages the hanger plate 131, the bell crank levers 53 will turn on their pivots 54, raising the locking bars and withdrawing the locking lugs 28, 28', from their engagement with the vertical slots 29 on the coupling bars. The coupling bars being now unlocked and free to move, said heads will separate and become uncoupled. The purpose of the spring 38 with the guide members 40 and 42 is to take care of the reciprocal movement of the drawbars of the cars A and B, and all other shocks incident to railway car transportation.

It is thus seen that I have constructed an apparatus for automatically coupling and uncoupling the electric, air and steam connections of railway cars which couple and uncouple substantially simultaneously with the car drawbar coupler.

My apparatus needs no attention whatever, is absolutely positive in operation and will operate even though said connections are out of vertical and horizontal alinement.

While I have shown the preferred apparatus for automatically coupling and uncoupling electric, steam and air connections of railway cars, I do not wish to confine myself to the specific details of construction and arrangement as described, as it is obvious that various changes in the construction, combination and arrangement of parts may be made by those skilled in the art without departing from the spirit of my invention as defined in the appended claims.

I claim:

1. The combination of railway cars provided with automatic couplers for the drawbars, a pair of coöperating coupling heads provided with end connections of electric, steam and air conduits, adapted to make tight joints when said heads are in coupling position, protector plates projecting horizontally from the upper forward ends of said heads adapted to form a roof over said joints, hangers arranged in pairs and connected to said cars for supporting said heads, one hanger of each of said pairs being stationary, the other hanger being vertically movable in relation to said car, a horizontal supporting member for each head slidably mounted in said hangers, means for limiting the horizontal movement of said supporting member in relation to said hangers, coupling bars projecting from said heads and provided on their inner sides with inclined notches and vertical slots, the free ends of said coupling bars being inclined horizontally from said heads, guide bars arranged in pairs on said heads to coöperate with the coupling bars of the opposite head, the free ends of said guide bars forming divergent vertical angles adapted to guide the coupling bars of the opposite head in locking position, vertical locking bars slidably mounted on the sides of said heads, lugs on said locking bars adapted to coöperate with said notches and to engage said slots of the coupling bars, levers fulcrumed to said heads for operating said locking bars, rods operatively connected to said levers, springs engaging said rods and tending to move said lugs in locking engagement with said coupling bars and means on said rods operative when said cars recede from each other a predetermined distance for operating said levers to unlock said coupling bars and allow said heads to separate.

2. The combination of railway cars provided with automatic couplers for the drawbars, a pair of coöperating coupling heads provided with end connections of electric, steam and air conduits adapted to make tight joints when said heads are in coupling position, hangers arranged in pairs and connected to said cars for supporting said heads, a horizontal supporting member for each head slidably mounted in said hangers, means for limiting the horizontal movement of said supporting member in relation to said hangers, coupling bars projecting from said heads and provided on their inner sides with inclined notches and vertical slots, the free ends of said coupling bars being inclined horizontally outward from said heads, guide bars arranged in pairs on said heads, the free ends of said guide bars forming divergent vertical angles adapted to guide the coupling bars of the opposite head in locking position, locking bars movably mounted on the sides of said heads, means on said locking bars adapted to coöperate with said notches and to engage said slots of the coupling bars, levers fulcrumed to said heads for operating said locking bars, rods operatively connected to said levers, resilient means tending to move said locking bars in locking engagement with said coupling bars and means operative when said cars recede from each other a pre-determined distance for operating said levers to unlock said coupling bars and allow said heads to separate.

3. The combination of railway cars provided with automatic couplers for the drawbars, a pair of coupling heads provided with end connections of one or more conduits adapted to make tight joints when said heads are in coupling position, hangers connected to said cars, head supporting members slidably mounted in said hangers, means for limiting the horizontal movement of said supporting member in relation to said hangers, coupling bars projecting from said heads and provided on their inner sides with vertical slots, the free ends of said coupling bars being inclined horizontally outward from said heads, guide bars arranged in pairs on said heads, the free ends of said guide bars forming divergent vertical angles adapted to guide the coupling bars of the opposite head in locking position, locking bars movably mounted on the sides of said heads and adapted to coöperate with said slots of said coupling bars, resilient means tending to move said locking bars in engagement with said coupling bars and means operative when said cars recede from each other a pre-determined distance for operating said levers to unlock said coupling bars and allow said heads to separate.

4. The combination of railway cars provided with automatic couplers for the drawbars thereof, a pair of coupling heads provided with end connections of one or more conduits adapted to make tight joints when said heads are in coupling position, hangers connected to said cars, a supporting member for each head slidably mounted in said hangers, means for limiting the horizontal movement of said supporting member in relation to said hangers, coupling bars projecting from said heads, the free ends of said coupling bars being inclined horizontally outward therefrom, guide bars arranged in pairs, the free ends of said guide bars forming divergent vertical angles adapted to guide the coupling bars of the opposite head in locking position, locking means movably mounted on the sides of said heads and adapted to engage said coupling bars, levers fulcrumed to said heads for operating said locking means, means operatively connected to said locking means for moving the latter into locking position, and means operative when said cars recede from each other a pre-determined distance for moving said locking means into inoperative position to release said coupling bars and allow said heads to separate.

5. The combination of railway cars provided with automatic couplers for the drawbars thereof, a pair of coupling heads provided with end connections of conduits adapted to make tight joints when said heads are in coupling position, hangers connected to said cars for supporting said heads, a head supporting member slidably mounted in said hangers, means for limiting the horizontal movement of said supporting member in relation to said hangers, coupling bars projecting from said heads, guide bars arranged in pairs and adapted to guide the coupling bars of the opposite head in locking position, locking bars movably mounted in said heads and adapted to lock said coupling bars in position, resilient means operatively connected to said locking bars to move the same into operative position and means operative when said cars recede from each other a pre-determined distance for moving said locking bars into inoperative position and allow said heads to separate.

6. The combination of railway cars provided with automatic couplers for the drawbars thereof, a pair of coupling heads provided with end connections of conduits adapted to make tight joints when said heads are in coupling position, a head supporting hanger connected to said cars, a head supporting member slidably mounted in said hanger, coupling bars projecting from said heads, said coupling bars having vertical grooves for the reception of the locking bars, guide bars arranged in pairs on said heads, the free ends of said guide bars forming divergent angles adapted to guide the coupling bars of the opposite head in locking position, locking bars movably mounted for vertical movement on said heads, and adapted to engage vertical grooves of said coupling bars in locking relation, resilient means operatively connected to said locking bars and tending to move the same into operative position and means operative when said cars recede from each other a pre-determined distance for moving said locking bars into inoperative position and allowing said heads to separate.

In testimony whereof I have signed my name to this specification.

THOMAS J. FUTRELL.